US 10,097,067 B2

(12) United States Patent
Inoue et al.

(10) Patent No.: US 10,097,067 B2
(45) Date of Patent: Oct. 9, 2018

(54) LIQUEFACTION SYSTEM AND POWER GENERATION SYSTEM

(71) Applicants: Kobe Steel, Ltd., Hyogo (JP); JAPAN SUPERCONDUCTOR TECHNOLOGY INC., Hyogo (JP)

(72) Inventors: Kenichi Inoue, Kobe (JP); Kazuyoshi Saitou, Kobe (JP); Kyoji Zaitsu, Kobe (JP); Koji Inoue, Kobe (JP); Satoshi Ito, Kobe (JP)

(73) Assignees: Kobe Steel, Ltd., Hyogo (JP); JAPAN SUPERCONDUCTOR TECHNOLOGY INC., Hyogo (JP)

( * ) Notice: Subject to any disclaimer, the term of this patent is extended or adjusted under 35 U.S.C. 154(b) by 165 days.

(21) Appl. No.: 15/061,178

(22) Filed: Mar. 4, 2016

(65) Prior Publication Data
US 2016/0268874 A1    Sep. 15, 2016

(30) Foreign Application Priority Data
Mar. 9, 2015   (JP) .................................. 2015-046253

(51) Int. Cl.
*F25J 1/00*   (2006.01)
*H02K 9/20*   (2006.01)
(Continued)

(52) U.S. Cl.
CPC .................. *H02K 9/20* (2013.01); *F01K 5/00* (2013.01); *F25J 1/004* (2013.01); *F25J 1/0022* (2013.01);
(Continued)

(58) Field of Classification Search
CPC ........ F25J 1/0022; F25J 1/0025; F25J 1/0284; F25J 1/004; F25J 1/005; F25J 1/0261;
(Continued)

(56) References Cited

U.S. PATENT DOCUMENTS

| 3,857,245 A * | 12/1974 | Jones ..................... F25J 1/0025 60/651 |
| 2012/0289407 A1* | 11/2012 | Nelson ................... F25J 1/0022 505/163 |
| 2017/0350649 A1* | 12/2017 | Hirao ..................... F25J 1/0298 |

FOREIGN PATENT DOCUMENTS

| JP | 2007-083851 A | 4/2007 |
| JP | 2014-054092 A | 3/2014 |

* cited by examiner

*Primary Examiner* — Keith Raymond
(74) *Attorney, Agent, or Firm* — Studebaker & Brackett PC

(57) ABSTRACT

Liquefier includes first compression section which is driven by a superconducting motor and which compresses a substance in a gaseous state. Cooling circuit includes: second compression section which is driven by the motor when first compression section is being driven by the motor and which compresses a refrigerant; first heat exchange section which cools the refrigerant by causing heat exchange between a substance in a tank and the compressed refrigerant; second expansion section which brings the refrigerant down to or below a critical temperature of a superconducting material by expanding the cooled refrigerant; and second heat exchange section which imparts cold heat of the refrigerant to the substance by causing heat exchange between the substance in the tank and the refrigerant after cooling a superconducting magnet, and supplies the refrigerant brought down to or below the critical temperature by second expansion section to the motor and cools the superconducting magnet.

6 Claims, 7 Drawing Sheets

(51) Int. Cl.
  *H02K 7/18* (2006.01)
  *H02K 55/02* (2006.01)
  *F01K 5/00* (2006.01)
  *F25J 1/02* (2006.01)

(52) U.S. Cl.
  CPC .......... *F25J 1/0025* (2013.01); *F25J 1/0035* (2013.01); *F25J 1/0202* (2013.01); *F25J 1/0236* (2013.01); *F25J 1/0257* (2013.01); *F25J 1/0261* (2013.01); *F25J 1/0284* (2013.01); *F25J 1/0288* (2013.01); *F25J 1/0292* (2013.01); *H02K 7/1823* (2013.01); *H02K 55/02* (2013.01); *F25J 2230/22* (2013.01); *F25J 2270/12* (2013.01); *F25J 2270/42* (2013.01); *F25J 2290/62* (2013.01)

(58) Field of Classification Search
  CPC ...... F25J 1/0288; F25J 2230/22; F25J 1/0285; F25J 1/0287; F25J 2270/04; F25J 2270/14; H02K 19/103; H02K 19/20; H02K 1/243; H02K 1/246; H02K 55/02; H02K 55/04; F01K 5/00; F02C 1/10
  See application file for complete search history.

LIQUEFACTION SYSTEM AND POWER GENERATION SYSTEM

TECHNICAL FIELD

The present invention relates to a liquefaction system and a power generation system which use a superconducting motor.

BACKGROUND ART

A superconducting motor is a motor that rotates a rotor using a superconducting magnet. A superconducting motor is used in a state where a superconducting magnet is cooled to or below a critical temperature of a superconducting material that constitutes the superconducting magnet. The superconducting magnet is cooled using a refrigerant with a boiling point that is equal to or lower than the critical temperature. After cooling the superconducting magnet, the refrigerant is cooled to or below the critical temperature by a cooling circuit and is once again used to cool the superconducting magnet.

When the critical temperature of a superconducting material is higher than a boiling point of liquid nitrogen, liquid nitrogen can be used as the refrigerant. The boiling point of liquid nitrogen, 77 K, has a relatively small difference from the boiling point of liquefied natural gas (111 K). In consideration thereof, if the refrigerant after cooling the superconducting magnet is to be cooled using a heat exchange between the refrigerant (liquid nitrogen) and liquefied natural gas, energy required for bringing a temperature of the refrigerant down to or below the critical temperature can be reduced. An example of such a technique is disclosed in Japanese Unexamined Patent Publication No. 2007-83851.

When a compressor used in a process of liquefying natural gas is driven by a superconducting motor, cost required by the process of liquefying natural gas can be lowered by reducing energy for bringing a refrigerant down to or below the critical temperature. Since a major portion of the cost of liquefied natural gas is incurred in the process of liquefying natural gas, by reducing the cost of this process, a significant reduction in the cost of liquefied natural gas can be achieved.

In a similar manner, in a power generation system provided with a turbine which rotates using energy generated by burning natural gas created by liquefying liquefied natural gas retrieved from a tank and a superconducting generator which is driven by a rotation of the turbine and which generates power, power generation cost can be lowered by reducing energy for bringing a refrigerant down to or below the critical temperature.

SUMMARY OF INVENTION

An object of the present invention is to provide a liquefaction system and a power generation system capable of reducing energy for bringing a refrigerant, which cools a superconducting magnet of a superconducting motor down to or below a critical temperature, down to or below the critical temperature.

A liquefaction system according to a first aspect of the present invention is configured as follows. A liquefier is driven by a superconducting motor and includes a first compression section which compresses a substance in a gaseous state. A cooling circuit includes: a second compression section which is driven by the superconducting motor when the first compression section is being driven by the superconducting motor and which compresses a refrigerant; a first heat exchange section which cools the refrigerant by causing a heat exchange between a substance stored in a storage section and the compressed refrigerant; a second expansion section which brings the refrigerant down to or below a critical temperature of a superconducting material by expanding the cooled refrigerant; and a second heat exchange section which imparts cold heat of the refrigerant to the substance by causing a heat exchange between the substance stored in the storage section and the refrigerant after cooling a superconducting magnet, and supplies the refrigerant brought down to or below the critical temperature by the second expansion section to the superconducting motor and cools the superconducting magnet down to or below the critical temperature.

A power generation system according to a second aspect of the present invention is configured as follows. A turbine rotates using energy created by burning a substance supplied from a storage section. A superconducting generator generates power as a rotary shaft is rotated by the rotation of the turbine. A cooling circuit includes: a compression section which is driven by a rotation of the rotary shaft and which compresses a refrigerant; a first heat exchange section which cools the refrigerant by causing a heat exchange between the substance stored in the storage section and the compressed refrigerant; an expansion section which brings the refrigerant down to or below a critical temperature of a superconducting material by expanding the cooled refrigerant; and a second heat exchange section which imparts cold heat of the refrigerant to the substance by causing a heat exchange between the substance stored in the storage section and the refrigerant after cooling a superconducting magnet, and supplies the refrigerant brought down to or below the critical temperature by the expansion section to the superconducting generator and cools the superconducting magnet down to or below the critical temperature.

The above and other objects, features, and advantages of the present invention will become more apparent as the following detailed description is read with reference to the accompanying drawings.

DESCRIPTION OF EMBODIMENTS

Figure 1:
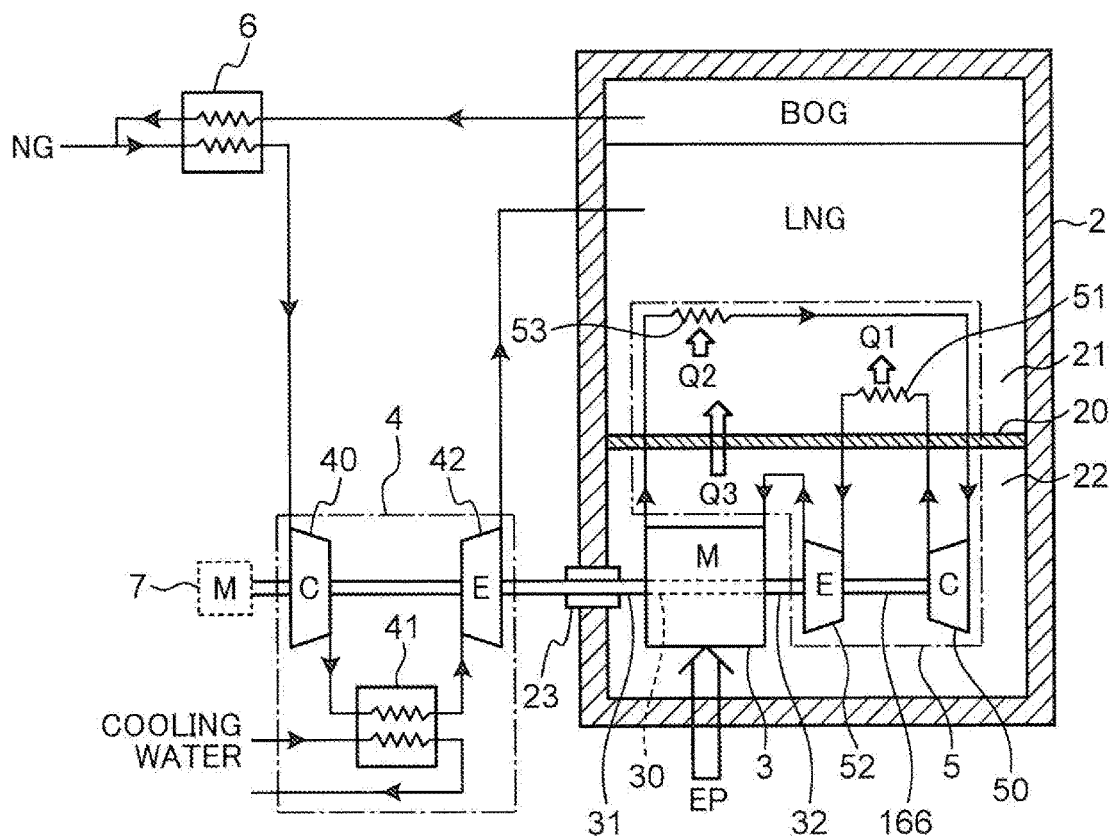
FIG. 1 is a configuration diagram showing a configuration of a liquefaction system according to a first embodiment.

Hereinafter, embodiments of the present invention will be described in detail with reference to the drawings. FIG. 1 is a configuration diagram showing a configuration of a liquefaction system 1a according to a first embodiment. The liquefaction system 1a includes a tank 2, a superconducting motor 3, a liquefier 4, a cooling circuit 5, a third heat exchange section 6, and a start-up motor 7.

The tank 2 has a heat-insulating airtight structure and stores liquefied natural gas (LNG). The tank 2 is an example of the storage section which stores a substance with a boiling point equal to or below room temperature in a liquid state. While natural gas will be described as an example of the substance with a boiling point equal to or below room temperature, other examples include nitrogen and hydrogen. The room temperature is, for example, 25° C.

The tank 2 is divided into a first space section 21 and a second space section 22 by a partition 20. The first space section 21 and the second space section 22 are isolated from each other by the partition 20. The first space section 21 stores liquefied natural gas. A part of the liquefied natural gas in the first space section 21 is in the form of boil off gas (BOG). In this case, BOG is natural gas.

The superconducting motor 3 and a part of the cooling circuit 5 (a second compression section 50 and a second expansion section 52) are arranged in the second space section 22. A through-hole that continues to the second space section 22 is formed on an outer wall of the tank 2, and one side 31 of a rotary shaft 30 of the superconducting motor 3 extends through the through-hole to the outside of the tank 2 from the second space section 22. The through-hole is filled with a seal member 23.

Natural gas (NG) that is a liquefaction object is sent to the third heat exchange section 6. The third heat exchange section 6 is a heat exchanger which causes a heat exchange between natural gas and BOG sent from the first space section 21 of the tank 2. The BOG after the heat exchange joins with natural gas prior to heat exchange.

The liquefier 4 includes a first compression section 40, a fourth heat exchange section 41, and a first expansion section 42, and generates liquefied natural gas (a substance in a liquid state) to be stored in the tank 2 by a Joule-Thomson process. The first compression section 40 is connected to the third heat exchange section 6. The first compression section 40 and the fourth heat exchange section 41 are connected to each other. The fourth heat exchange section 41 and the first expansion section 42 are connected to each other. The first expansion section 42 and the first space section 21 of the tank 2 are connected to each other.

The first compression section 40 is a compressor which compresses natural gas (a substance in a gaseous state) subjected to heat exchange by the third heat exchange section 6.

The fourth heat exchange section 41 is a heat exchanger which causes a heat exchange between natural gas compressed by the first compression section 40 and cooling water. Accordingly, the compressed natural gas is cooled.

The first expansion section 42 is an expander which expands the natural gas cooled by the fourth heat exchange section 41. Accordingly, the natural gas changes to liquefied natural gas. In this manner, the first expansion section 42 changes a substance compressed by the first compression section 40 from a gaseous state to a liquid state by expanding the substance. The liquefied natural gas is sent from the first expansion section 42 to the first space section 21 of the tank 2 to be stored in the first space section 21.

The first compression section 40 and the first expansion section 42 are respectively driven by a rotational force that is transferred via the one side 31 of the rotary shaft 30 of the superconducting motor 3. Configurations of the first compression section 40 and the first expansion section 42 are similar to configurations of the second compression section 50 and the second expansion section 52 provided in the cooling circuit 5. Therefore, by describing the configurations of the second compression section 50 and the second expansion section 52, descriptions of the configurations of the first compression section 40 and the first expansion section 42 will be omitted. Moreover, the first expansion section 42 is not limited to a motor-driven type and may be any apparatus capable of expanding compressed natural gas (for example, an expansion valve).

The cooling circuit 5 is a refrigerator to which a Joule-Thomson process is applied and which includes the second compression section 50, a first heat exchange section 51, the second expansion section 52, and a second heat exchange section 53. Due to the cooling circuit 5, a superconducting magnet included in the superconducting motor 3 is cooled to or below a critical temperature of a superconducting material that constitutes the magnet. Examples of a superconducting magnet include a magnet constituted by a superconducting coil and a magnetic body core around which the superconducting coil is wound, and a superconducting bulk magnet. The second compression section 50 and the second expansion section 52 are respectively driven by a rotational force that is transferred via another side 32 of the rotary shaft 30 of the superconducting motor 3.

The cooling circuit 5 places the refrigerant in a state at or below the critical temperature of the superconducting material, sends the refrigerant in this state to the superconducting motor 3, and cools the superconducting magnet down to or below the critical temperature. When the superconducting material is, for example, a Bi-based superconducting material ($Bi_2Sr_2Ca_2Cu_3O_y$) or a Y-based superconducting material ($YBa_2Cu_3O_7$), liquid nitrogen (boiling point 77 K) can be used as the refrigerant. This is because the boiling point of liquid nitrogen is lower than the critical temperatures of these superconducting materials. Liquid nitrogen will be described as an example of the refrigerant. Moreover, liquefied natural gas has a boiling point (111 K) that is higher than the critical temperatures of Bi-based and Y-based superconducting materials.

The first heat exchange section 51 and the second heat exchange section 53 are arranged in the first space section 21 and the second compression section 50 and the second expansion section 52 are arranged in the second space section 22.

The second compression section 50 is a compressor which isothermally compresses nitrogen in a gaseous state (refrigerant). The second compression section 50 is driven by the superconducting motor 3 when the first compression section 40 and the first expansion section 42 are being driven by the superconducting motor 3, and compresses nitrogen. The second compression section 50 is connected to the first heat exchange section 51, and the compressed nitrogen is sent to the first heat exchange section 51.

The first heat exchange section 51 is a heat exchanger which cools compressed nitrogen by causing a heat exchange between the liquefied natural gas stored in the first space section 21 of the tank 2 and nitrogen compressed by the second compression section 50. As described above, the first heat exchange section 51 has a function of cooling the refrigerant by causing a heat exchange between the substance stored in the storage section and the refrigerant compressed by the second compression section 50. The first heat exchange section 51 is connected to the second expansion section 52, and nitrogen cooled by the first heat exchange section 51 is sent to the second expansion section 52.

The second expansion section 52 is an expander which is driven by the superconducting motor 3 when the first compression section 40 and the first expansion section 42 are being driven by the superconducting motor 3 and which changes nitrogen from a gaseous state to a liquid state by adiabatically expanding nitrogen cooled by the first heat exchange section 51. As described above, the second expansion section 52 has a function of bringing the refrigerant down to or below the critical temperature of the superconducting material by expanding the refrigerant cooled by the first heat exchange section 51. Nitrogen changed to a liquid state (in other words, liquid nitrogen) by the second expansion section 52 is sent to the superconducting motor 3, and after cooling the superconducting magnet, sent to the second heat exchange section 53.

The second expansion section 52 and the second compression section 50 share a rotor shaft 166. The second expansion section 52 is driven by a rotational force that is transferred via the other side 32 of the rotary shaft 30 of the superconducting motor 3. The second compression section 50 is driven as the rotational force is transferred to the rotor shaft 166 and causes the rotor shaft 166 to rotate. Moreover, the second expansion section 52 is not limited to a motor-driven type and may be any apparatus capable of expanding compressed natural gas (for example, an expansion valve).

The second heat exchange section 53 is a heat exchanger which imparts cold heat of nitrogen to liquefied natural gas by causing a heat exchange between the liquefied natural gas stored in the first space section 21 of the tank 2 and the nitrogen after cooling the superconducting magnet. As described above, the second heat exchange section 53 has a function of imparting cold heat of the refrigerant to the substance stored in the storage section by causing a heat exchange between the substance and the refrigerant after cooling the superconducting magnet.

The second heat exchange section 53 is connected to the second compression section 50, and nitrogen (nitrogen in a gaseous state) subjected to a heat exchange by the second heat exchange section 53 is sent to the second compression section 50.

As described above, the cooling circuit 5 cools the superconducting magnet down to or below the critical temperature by repetitively performing compression of the refrigerant by the second compression section 50, cooling of the refrigerant by the first heat exchange section 51, expansion of the refrigerant by the second expansion section 52, and discharge of cold heat of the refrigerant by the second heat exchange section 53.

The start-up motor 7 is a normal conducting motor which drives the first compression section 40, the first expansion section 42, the second compression section 50, and the second expansion section 52. When the liquefaction system 1a is started up, since liquefied natural gas is absent in the first space section 21 of the tank 2, there is no liquefied natural gas to be used for a heat exchange by the first heat exchange section 51 and the second heat exchange section 53.

In consideration thereof, a warm-up operation of the liquefaction system 1a is performed by the start-up motor 7. More specifically, the first compression section 40 and the first expansion section 42 of the liquefier 4 are driven by the start-up motor 7, liquefied natural gas is generated by the liquefier 4, and the liquefied natural gas is stored inside the first space section 21 of the tank 2. As the first compression section 40 and the first expansion section 42 are driven by the start-up motor 7, a drive force of the start-up motor 7 is transferred to the second expansion section 52 and the second compression section 50 via the rotary shaft 30 of the superconducting motor 3 and the second expansion section 52 and the second compression section 50 are also driven. Accordingly, the cooling circuit 5 is actuated.

Once a prescribed amount of liquefied natural gas is stored in the first space section 21 of the tank 2 and a temperature of the second space section 22 drops to a temperature of the liquefied natural gas due to cold heat of the liquefied natural gas, an operator of the liquefaction system 1a stops the start-up motor 7 to stop the warm-up operation of the liquefaction system 1a and actuates the superconducting motor 3 to switch the liquefaction system 1a to a steady operation.

Main effects of the first embodiment will now be described. In the liquefaction system 1a according to the first embodiment, since the first heat exchange section 51 cools nitrogen by causing a heat exchange between compressed nitrogen (refrigerant) and liquefied natural gas inside the first space section 21 (tank 2), heat Q1 is imparted from the nitrogen to the liquefied natural gas inside the first space section 21. Meanwhile, the second heat exchange section 53 imparts cold heat Q2 of the refrigerant to the liquefied natural gas in the first space section 21 by causing a heat exchange between the nitrogen after cooling the superconducting magnet and the liquefied natural gas in the first space section 21. Accordingly, due to the heat exchange by the first heat exchange section 51, the temperature of the liquefied natural gas in the first space section 21 can be prevented from rising. Moreover, heat Q3 is heat that is generated in the second space section 22 due to actuation of the superconducting motor 3, the second compression section 50 and the second expansion section 52. The heat Q3 is transferred from the second space section 22 to the first space section 21.

In addition, the liquefaction system 1a according to the first embodiment drives the second compression section 50 and the second expansion section 52 using only a part of the power of the superconducting motor 3 which drives the first compression section 40 and the first expansion section 42 provided in the liquefier 4.

As described above, with the liquefaction system 1a according to the first embodiment, since a motor for driving the second compression section 50 and the second expansion section 52 provided in the cooling circuit 5 is not separately provided, energy for bringing a refrigerant, which cools a superconducting magnet of the superconducting motor 3 down to or below a critical temperature, down to or below the critical temperature can be reduced.

In addition, since heat of the refrigerant is discharged to liquefied natural gas, a refrigerating efficiency of the liquefaction system 1a according to the first embodiment can be set to around 70%.

77 K (boiling point of liquid nitrogen)/110 K (temperature of liquefied natural gas)×100=70%.

By comparison, the refrigerating efficiency when the cooling circuit 5 is installed in a room temperature environment (25°=300 K) is approximately 25%.

77 K/300 K×100≅25%

Therefore, with the liquefaction system 1a according to the first embodiment, the cooling circuit 5 with a high refrigerating efficiency can be realized.

Furthermore, the liquefaction system 1a according to the first embodiment has the following effects. Since the first space section 21 and the second space section 22 are inside the tank 2, heat infiltrating into the second space section 22 from the outside can be reduced using the substance (liquefied natural gas) in the first space section 21. Therefore, with the liquefaction system 1a according to the first embodiment, since an amount of heat infiltration into the second space section 22 which houses the superconducting motor 3 and the second compression section 50 and the second expansion section 52 of the cooling circuit 5 can be reduced, energy for bringing the refrigerant down to or below the critical temperature can be reduced.

Figure 2:
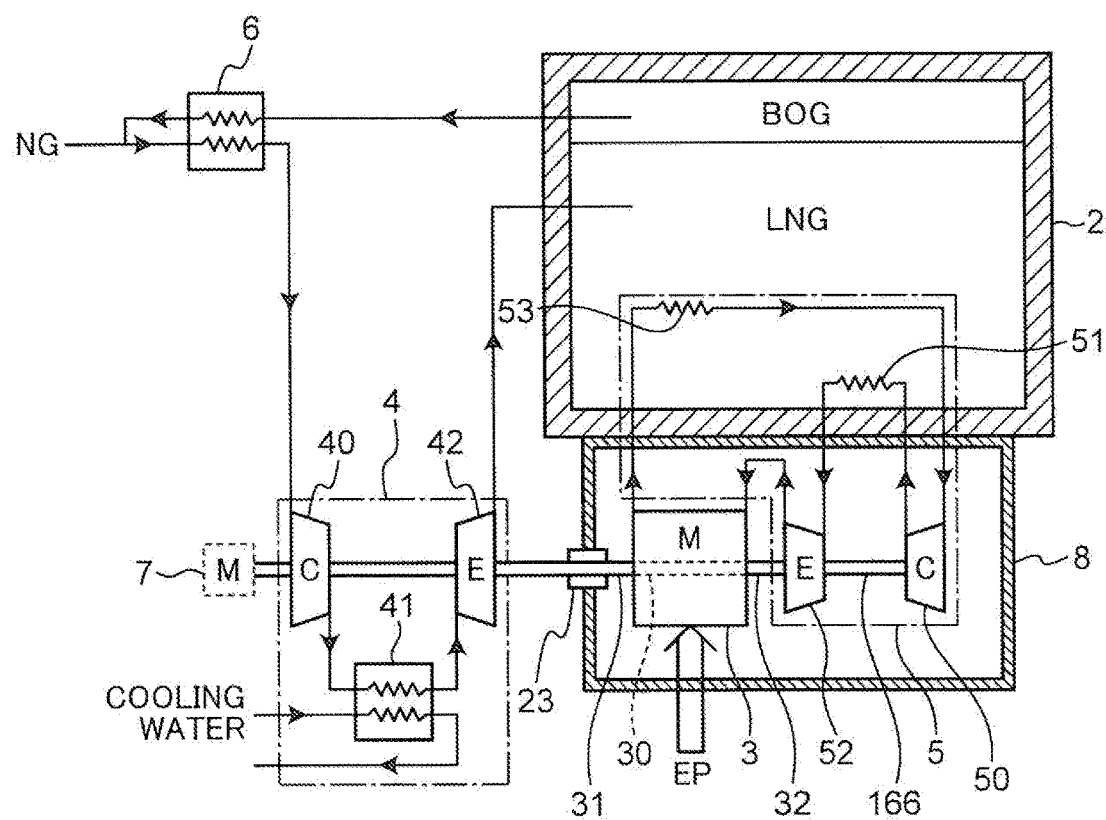
FIG. 2 is a configuration diagram showing a configuration of a liquefaction system according to a modification of the first embodiment.

A modification of the first embodiment will now be described. FIG. 2 is a configuration diagram showing a configuration of a liquefaction system 1b according to a modification of the first embodiment. Components shared with the liquefaction system 1a shown in FIG. 1 among components of the liquefaction system 1b will be denoted by the same reference numerals and descriptions thereof will be omitted.

The liquefaction system 1b includes a heat-insulating airtight container 8. The heat-insulating airtight container 8 is mounted to an outer wall of the tank 2. In other words, the heat-insulating airtight container 8 is mounted to the tank 2 on the outside of the tank 2. The heat-insulating airtight container 8 houses the superconducting motor 3 and the second compression section 50 and the second expansion section 52 of the cooling circuit 5. Therefore, since the second space section 22 which is a space for housing the superconducting motor 3, the second compression section 50, and the second expansion section 52 need no longer be provided in the tank 2, the partition 20 shown in FIG. 1 is not provided in the tank 2. The first heat exchange section 51 and the second heat exchange section 53 are arranged in the tank 2 storing liquefied natural gas.

By housing the superconducting motor 3 and the second compression section 50 and the second expansion section 52 of the cooling circuit 5 inside the heat-insulating airtight container 8, the temperature inside the container can be set to more or less the same temperature as that of the liquefied natural gas in the tank 2.

Efficiency of cooling the refrigerant (liquid nitrogen) declines as a distance between the first heat exchange section 51 and the second compression section 50 and a distance between the first heat exchange section 51 and the second expansion section 52 increase. According to the modification, since the heat-insulating airtight container 8 is mounted to the tank 2 on the outside of the tank 2, the distance between the first heat exchange section 51 and the second compression section 50 and the distance between the first heat exchange section 51 and the second expansion section 52 can be reduced.

As described above, according to the modification, energy for bringing the refrigerant (liquid nitrogen) down to or below the critical temperature can be reduced.

In addition, in the modification, by housing the superconducting motor 3, the second compression section 50, and the second expansion section 52 in the heat-insulating airtight container 8, the components are unitized and the unit is mounted to the outer wall of the tank 2. Therefore, compared to the liquefaction system 1a in which the superconducting motor 3, the second compression section 50, and the second expansion section 52 are housed inside the tank 2 as shown in FIG. 1, the modification enables operations for assembly of the cooling circuit 5, maintenance of the superconducting motor 3, the second compression section 50, and the second expansion section 52, and inspections of the superconducting motor 3, the second compression section 50, and the second expansion section 52 to be performed with greater ease.

Adopting a manufacturing plant of liquefied natural gas which is a system where a fractionating tower is provided next to the first expansion section 42 in the liquefaction system 1a shown in FIG. 1 or the liquefaction system 1b shown in FIG. 2 produces the following effects. Accordingly, by using the liquefaction system 1a or the liquefaction system 1b, a plant with a smaller size, lighter weight, and higher efficiency can be realized. Therefore, a plant floating directly above a gas field located in an ocean area or a sea area that is far away from land can be realized. With such a plant, since liquefied natural gas can be produced at a natural gas mining site and the produced liquefied natural gas can be loaded onto an LNG tanker, the cost of the liquefied natural gas can be reduced.

Figure 3:
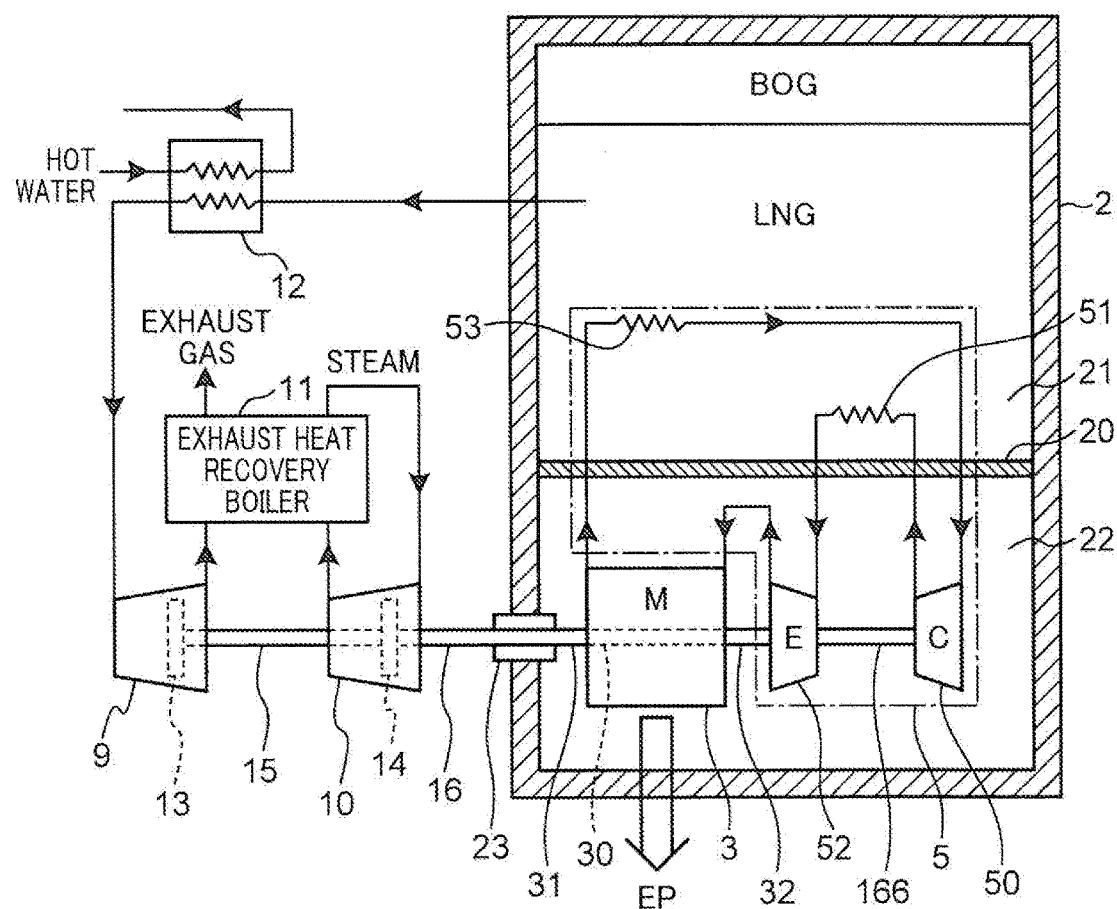
FIG. 3 is a configuration diagram showing a configuration of a power generation system according to a second embodiment.

A second embodiment will now be described. FIG. 3 is a configuration diagram showing a configuration of a power generation system 1c according to the second embodiment. Components shared with the liquefaction system 1a shown in FIG. 1 among components of the power generation system 1c will be denoted by the same reference numerals and descriptions thereof will be omitted. In the power generation system 1c, the superconducting motor 3 functions as a superconducting generator.

The power generation system 1c is a thermal power generation plant which generates power using liquefied natural gas stored in the tank 2 (in the first space section 21). The power generation system 1c is provided with a gas turbine 9, a steam turbine 10, an exhaust heat recovery boiler 11, and a fifth heat exchange section 12 in place of the liquefier 4 and the third heat exchange section 6 shown in FIG. 1.

The power generation system 1c performs combined cycle power generation by combining the gas turbine 9 and the steam turbine 10. A turbine 13 of the gas turbine 9 and a turbine 14 of the steam turbine 10 are connected to each other by a rotary shaft 15. The turbine 14 of the steam turbine 10 and the rotary shaft 30 of the superconducting motor 3 are connected to each other by a rotary shaft 16.

The liquefied natural gas stored in the tank 2 (in the first space section 21) is sent to the fifth heat exchange section 12. The fifth heat exchange section 12 is a heat exchanger which causes a heat exchange between liquefied natural gas and hot water. Due to this heat exchange, the liquefied natural gas changes to natural gas. The fifth heat exchange section 12 is connected to the gas turbine 9.

The gas turbine 9 burns natural gas sent from the fifth heat exchange section 12 and rotates the turbine 13 using gas created by the combustion. The rotation of the turbine 13 is transferred to the rotary shaft 30 of the superconducting motor 3 via the rotary shaft 15, the turbine 14, and the rotary shaft 16.

Exhaust heat of the gas turbine 9 is sent to the exhaust heat recovery boiler 11, and the exhaust heat recovery boiler 11 generates steam using the exhaust heat. The steam causes the turbine 14 of the steam turbine 10 to rotate. The rotation of the turbine 14 is transferred to the rotary shaft 30 of the superconducting motor 3 via the rotary shaft 16.

The turbine 13 and the turbine 14 function as turbines that rotate using energy created by burning the liquefied natural gas supplied from the tank 2 (the first space section 21).

As rotational forces of the turbine 13 and the turbine 14 are transferred to the rotary shaft 30 and causes the rotary shaft 30 to rotate, the superconducting motor 3 generates power.

In addition, the rotation of the rotary shaft 30 drives the second expansion section 52 and the second compression section 50 and actuates the cooling circuit 5. Accordingly, the refrigerant (liquid nitrogen) placed in a state at or below the critical temperature is sent to the superconducting motor 3 and the superconducting magnet of the superconducting motor 3 is cooled to or below the critical temperature.

Main effects of the second embodiment will now be described. In the power generation system 1c according to the second embodiment, since the first heat exchange section 51 cools nitrogen by causing a heat exchange between compressed nitrogen (refrigerant) and liquefied natural gas inside the first space section 21 (tank 2), heat is imparted from the nitrogen to the liquefied natural gas inside the first space section 21. Meanwhile, the second heat exchange section 53 imparts cold heat of the refrigerant to the liquefied natural gas in the first space section 21 by causing a heat exchange between the nitrogen after cooling the superconducting magnet and the liquefied natural gas in the first space section 21. Accordingly, due to the heat exchange by the first heat exchange section 51, the temperature of the liquefied natural gas in the first space section 21 can be prevented from rising.

In addition, in the power generation system 1c according to the second embodiment, when power is being generated by rotating the rotary shaft 30 of the superconducting motor 3 using the rotation of the turbines 13 and 14, the second compression section 50 and the second expansion section 52 are driven only using the rotation of the rotary shaft 30.

As described above, with the power generation system 1c according to the second embodiment, since a motor for driving the second compression section 50 and the second expansion section 52 provided in the cooling circuit 5 is not separately provided, energy for bringing a refrigerant, which cools a superconducting magnet of the superconducting motor 3 down to or below a critical temperature, down to or below the critical temperature can be reduced.

Since the power generation system 1c generates power with the superconducting motor 3, the power generation system 1c can be downsized. Therefore, an off-land thermal generation plant can be realized in which the power generation system 1c is installed on a floating body on the sea. In addition, by mounting the power generation system 1c on an LNG tanker that transports liquefied natural gas, power generated by the power generation system 1c can drive a propulsion screw that propels the tanker.

The power generation system 1c according to the second embodiment has a similar modification to that of the liquefaction system 1a according to the first embodiment. More specifically, as shown in FIG. 2, the modification includes the heat-insulating airtight container 8 which is mounted to the outside of the tank 2 and which houses the superconducting motor 3 and the second compression section 50 and the second expansion section 52 of the cooling circuit 5.

Next, matters [1] to [11] that are commonly applied to the liquefaction system 1a according to the first embodiment shown in FIG. 1, the liquefaction system 1b according to the modification of the first embodiment shown in FIG. 2, and the power generation system 1c according to the second embodiment shown in FIG. 3 will be described.

Figure 4:
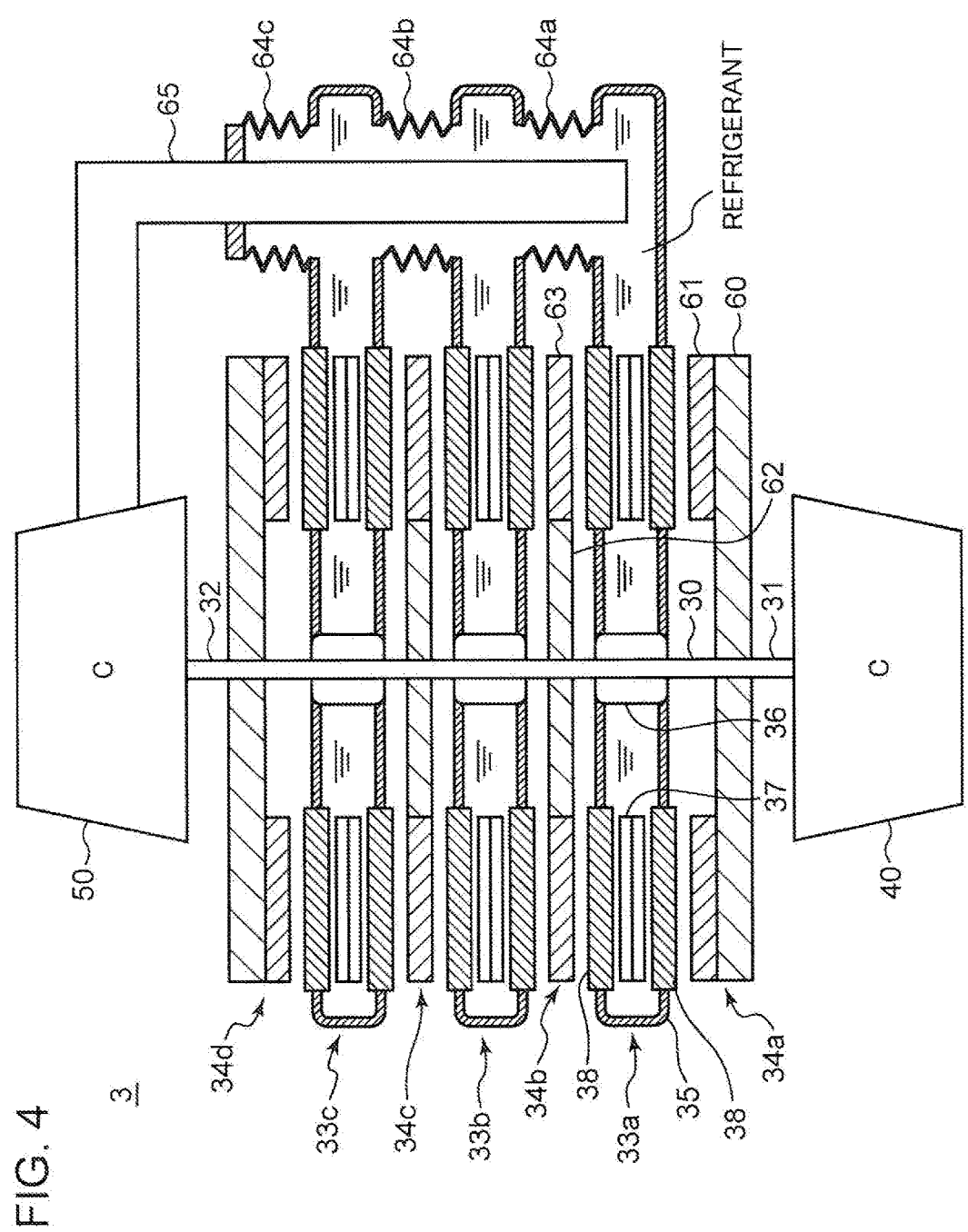
FIG. 4 is a sectional view showing a configuration of a superconducting motor.

[1] FIG. 4 is a sectional view showing a configuration of the superconducting motor 3. The superconducting motor 3 includes the rotary shaft 30, a first stator 33a, a second stator 33b, a third stator 33c, a first rotor 34a, a second rotor 34b, a third rotor 34c, and a fourth rotor 34d. The first stator 33a, the second stator 33b, and the third stator 33c are arranged at intervals from the first compression section 40 toward the second compression section 50. Compared to FIGS. 1 to 3, FIG. 4 shows a position of the first compression section 40 and a position of the first expansion section 42 in reverse and shows a position of the second compression section 50 and a position of the second expansion section 52 in reverse. Moreover, in the case of the power generation system 1c shown in FIG. 3, the turbine 14 takes the place of the second compression section 50.

The first stator 33a is a stator for generating a W phase. The first stator 33a includes a heat-insulating container 35, a bearing 36, a superconducting coil 37, and a partition 38.

The heat-insulating container 35 is made of a nonmagnetic metal material. The heat-insulating container 35 has a disk-like shape. The bearing 36 is arranged in a central portion of the heat-insulating container 35. The bearing 36 rotatably holds the rotary shaft 30.

The heat-insulating container 35 has a hollow structure. The superconducting coil 37 is arranged inside the heat-insulating container 35 so as to surround the bearing 36. The superconducting coil 37 is wound around a magnetic body core (not shown) that is fixed inside the heat-insulating container 35. The magnetic body core and the superconducting coil 37 constitute a superconducting magnet. The inside of the heat-insulating container 35 is filled with the refrigerant (liquid nitrogen) at or below the critical temperature generated by the cooling circuit 5 shown in FIGS. 1 to 3.

The heat-insulating container 35 has a ring-like through-hole at a location opposing the superconducting coil 37. The through-hole is blocked by the partition 38. The partition 38 has heat-insulating, nonmagnetic, and insulating properties or heat-insulating, nonmagnetic, and high-resistance properties. The partition 38 is made of, for example, hardened glass, ceramic, or hardened plastic.

The partition 38 is given heat-insulating properties in order to provide heat insulation between the inside of the heat-insulating container 35 which is filled with the refrigerant and the outside of the heat-insulating container 35 which is a low-temperature atmosphere or a vacuum. The partition 38 is given nonmagnetic properties in order to magnetically couple the superconducting coil 37 and the magnetic body core (not shown) around which the superconducting coil 37 is wound with permanent magnets 61 and 63. The partition 38 is given insulating or high-resistance properties in order to prevent an eddy current from being generated in the partition 38. This is because heat is generated by the partition 38 if an eddy current is generated in the partition 38 due to a variable magnetic field created by the magnetic coupling described above.

The second stator 33b is a stator for generating a V phase and the third stator 33c is a stator for generating a U phase. Since configurations of the second stator 33b and the third stator 33c are the same as the configuration of the first stator 33a, a description thereof will be omitted.

As a configuration of the superconducting coils 37 respectively included in the first stator 33a, the second stator 33b, and the third stator 33c, for example, a same configuration as that of a coil included in a stator disclosed in Japanese Unexamined Patent Publication No. 2014-54092 can be adopted.

The first rotor 34a, the second rotor 34b, the third rotor 34c, and the fourth rotor 34d are arranged at intervals from the first compression section 40 toward the second compression section 50. The first stator 33a is sandwiched between the first rotor 34a and the second rotor 34b with a prescribed interval there-between. The second stator 33b is sandwiched between the second rotor 34b and the third rotor 34c with a prescribed interval there-between. The third stator 33c is sandwiched between the third rotor 34c and the fourth rotor 34d with a prescribed interval there-between.

The rotary shaft 30 is fixed to respective center portions of the first rotor 34a, the second rotor 34b, the third rotor 34c, and the fourth rotor 34d, and the rotary shaft 30 rotates as the first rotor 34a, the second rotor 34b, the third rotor 34c, and the fourth rotor 34d rotate.

The first rotor 34a includes a magnetic material yoke 60 and the permanent magnet 61. The magnetic material yoke 60 has a disk-like shape. The permanent magnet 61 is arranged on a surface opposing the first stator 33a of the magnetic material yoke 60. The permanent magnet 61 surrounds the rotary shaft 30 and is arranged so as to oppose the partition 38 and the superconducting coil 37 included in the first stator 33a.

The second rotor 34b includes a structural member 62 and the permanent magnet 63. The structural member 62 has a disk-like shape. The permanent magnet 63 is arranged on a peripheral surface of the structural member 62. The permanent magnet 63 surrounds the rotary shaft 30 and is arranged so as to oppose the partition 38 and the superconducting coil 37 included in the first stator 33a as well as the partition 38 and the superconducting coil 37 included in the second stator 33b.

The third rotor 34c shares the same configuration as the second rotor 34b. The permanent magnet 63 of the third rotor 34c surrounds the rotary shaft 30 and is arranged so as to oppose the partition 38 and the superconducting coil 37 included in the second stator 33b as well as the partition 38 and the superconducting coil 37 included in the third stator 33c.

The fourth rotor 34d shares the same configuration as the first rotor 34a. The permanent magnet 61 of the fourth rotor 34d surrounds the rotary shaft 30 and is arranged so as to oppose the partition 38 and the superconducting coil 37 included in the third stator 33c.

The permanent magnets 61 and 63 are, for example, rare earth-based permanent magnets. Since a rare earth-based permanent magnet has a high coercive force, the superconducting motor 3 can be realized with high torque density in the first embodiment and the modification thereof and a high-performance generator (the superconducting motor 3) can be realized in the second embodiment and the modification thereof.

In recent years, research is being conducted for the purpose of realizing a strong permanent magnet by confining magnetic flux inside a bulky oxide superconductor using a pinning effect of the oxide superconductor. Superconducting bulk magnets may be used as the permanent magnets. Since a superconducting bulk magnet has a coercive force that is equal to or higher than those of conventional permanent magnets, a highly-efficient superconducting motor 3 can be realized by replacing a conventional permanent magnet with a superconducting bulk magnet.

A first pipe section 64a, a second pipe section 64b, and a third pipe section 64c are arranged along a direction of the rotary shaft 30. The first pipe section 64a connects the heat-insulating container 35 of the first stator 33a and the heat-insulating container 35 of the second stator 33b with each other. The inside of the heat-insulating container 35 of the first stator 33a and the inside of the heat-insulating container 35 of the second stator 33b are communicated with each other via the first pipe section 64a. The second pipe section 64b connects the heat-insulating container 35 of the second stator 33b and the heat-insulating container 35 of the third stator 33c with each other. The inside of the heat-insulating container 35 of the second stator 33b and the inside of the heat-insulating container 35 of the third stator 33c are communicated with each other via the second pipe section 64b.

One end of the third pipe section 64c is connected to the third stator 33c. A transport pipe 65 enters the third pipe section 64c from another end of the third pipe section 64c and is passed through the inside of the heat-insulating container 35 of the third stator 33c, the second pipe section 64b, the inside of the heat-insulating container 35 of the second stator 33b, the first pipe section 64a, and the heat-insulating container 35 of the first stator 33a. The refrigerant is sent from the second compression section 50 through the transport pipe 65 to the respective heat-insulating containers 35 of the first stator 33a, the second stator 33b, and the third stator 33c. The refrigerant sent to the heat-insulating containers 35 is sent to the second heat exchange section 53 through a transport pipe (not shown). In this manner, the refrigerant is circulated between the cooling circuit 5 and the respective heat-insulating containers 35 of the first stator 33a, the second stator 33b, and the third stator 33c.

Since the first pipe section 64a, the second pipe section 64b, and the third pipe section 64c are required to be airtight, the pipe sections are usually constituted by metal. The superconducting motor 3 is assembled in a normal temperature environment and used in an environment at or below the critical temperature. Therefore, in order to absorb thermal deformation of the first pipe section 64a, the second pipe section 64b, and the third pipe section 64c, the pipe sections have a bellows structure.

[2] The second compression section 50 shown in FIGS. 1 to 3 compresses a refrigerant at atmospheric pressure (1 atmospheric pressure) supplied from the second heat exchange section 53 to 4 atmospheric pressure. In other words, a compression ratio of the second compression section 50 is 4. The ability of the cooling circuit 5 to bring the temperature of the refrigerant down from 113 K (the boiling point of liquefied natural gas) to 77 K (the boiling point of liquid nitrogen) due to this compression ratio will now be described.

A relationship between pressures P1 and P2 of the refrigerant before and after expansion by the second expansion section 52 and temperatures T1 and T2 of the refrigerant before and after expansion is represented by Expression (1) below based on the Joule-Thomson relational expression.

$$T_2 = T_1 \cdot \left(\frac{P_2}{P_1}\right)^{\frac{\gamma-1}{\gamma}} \tag{1}$$

$$\gamma = \frac{C_p}{C_v} \approx 1.4$$

Cp denotes specific heat at constant pressure and Cv denotes specific heat at constant volume. Moreover, the temperature T1 of the refrigerant before adiabatic expansion is 113 K.

Figure 5:
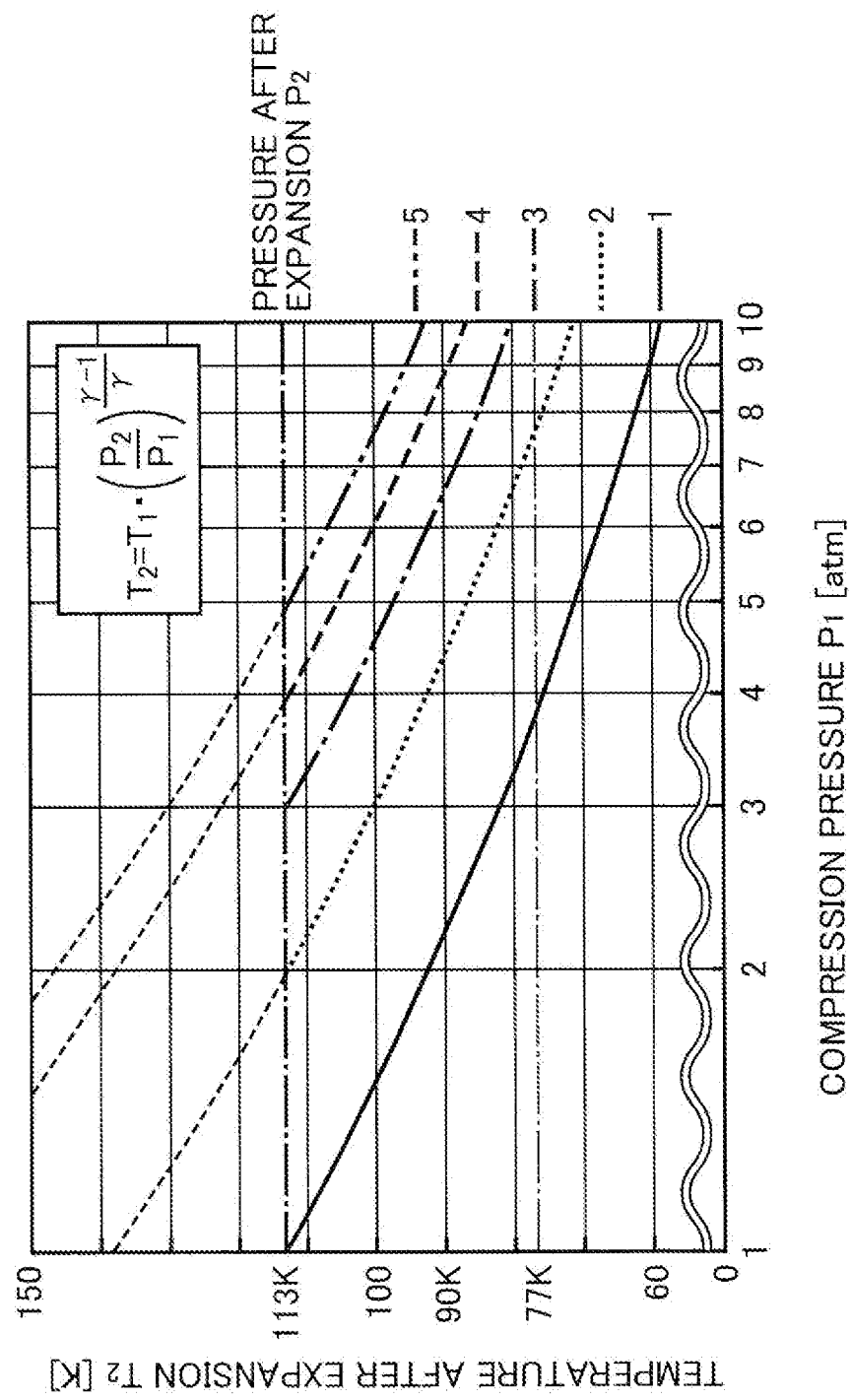
FIG. 5 is a graph showing a relationship between a temperature of a refrigerant after expansion and compression pressure.

FIG. 5 is a graph representation of this relationship. A horizontal axis represents compression pressure and a vertical axis represents a temperature of the refrigerant after expansion. Reference numerals 1 to 5 denote pressure of the refrigerant after expansion. As denoted by reference numeral 1, it is shown that, when the pressure of the refrigerant after compression is 1, the temperature of the refrigerant can be brought down from 113 K to 77 K by setting compression pressure to 4 (by setting the compression ratio to 4).

[3] According to the first embodiment and the modification thereof as well as the second embodiment, with respect to energy applied for liquefying natural gas, a relationship between an amount that increases due to the addition of the cooling circuit 5 and an amount that decreases due to the use of the superconducting motor 3 as a motor can be arranged to satisfy amount of increase<amount of decrease. A detailed description of the above will now be given using the liquefaction system 1a shown in FIG. 1 and a comparative example thereof.

Figure 6:
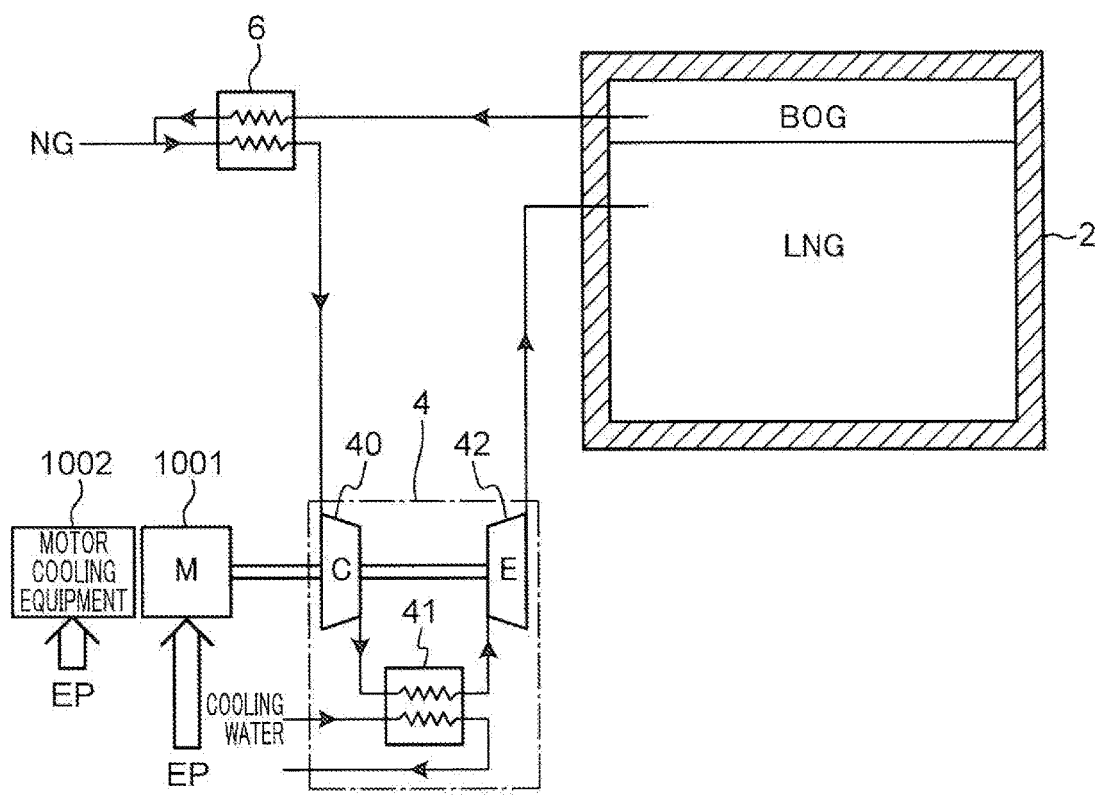
FIG. 6 is a configuration diagram showing a configuration of a liquefaction system according to a comparative example.

FIG. 6 is a configuration diagram showing a configuration of a liquefaction system 1000 according to a comparative example. Components shared with the liquefaction system 1a shown in FIG. 1 among components of the liquefaction system 1000 will be denoted by the same reference numerals and descriptions thereof will be omitted. The liquefaction system 1000 includes a normal conducting motor 1001 instead of the superconducting motor 3 and motor cooling equipment 1002 instead of the cooling circuit 5. The normal conducting motor 1001 is placed in a room temperature environment. The motor cooling equipment 1002 cools heat generated by the normal conducting motor 1001.

First, in the liquefaction system 1a shown in FIG. 1, the following 0-order approximate conditions will be considered.

1) The superconducting motor 3 generates zero heat (zero copper loss and sufficiently small motor loss).

2) Heat load of the cooling circuit 5 is limited to heat entering through an appropriate heat-insulating structure wall constituting a case of the superconducting motor 3 (liquefied natural gas: 110 K→inside of case: 77 K).

3) The second compression section 50 is cooled by liquefied natural gas and the second expansion section 52 is cooled by liquid nitrogen.

4) The second compression section 50, the superconducting motor 3, and the second expansion section 52 are coupled by a heat-insulating shaft.

5) Nitrogen gasified in the case of the superconducting motor 3 releases cold heat to liquefied natural gas at the second heat exchange section 53 (in other words, nitrogen gasified in the case of the superconducting motor 3 is warmed by liquefied natural gas at the second heat exchange section 53) and is then sent to the second compression section 50.

6) Nitrogen compressed at the second compression section 50 releases compression heat to liquefied natural gas at the first heat exchange section 51 (in other words, nitrogen compressed at the second compression section 50 is cooled by liquefied natural gas at the first heat exchange section 51) and is then sent to the second expansion section 52.

Moreover, machine loss at the second compression section 50, the superconducting motor 3, the second expansion section 52, and the like will be taken into consideration by a first order approximation.

Ideally, a difference in the amounts of heat between 5) and 6) is equal to a value obtained by multiplying infiltration heat of 2) by heat pump efficiency.

The liquefaction system 1a shown in FIG. 1 and the liquefaction system 1000 shown in FIG. 6 both satisfy (copper loss of the normal conducting motor 1001+operating power of the motor cooling equipment 1002)>operating power of the cooling circuit 5. These are design conditions that are sufficiently satisfied by real-life systems. A concept of the liquefaction system 1a shown in FIG. 1 can be regarded as a so-called exergy recuperation system or a system of a so-called self-heat recuperation heat circulation module (self-cold heat recuperation cold heat circulation module). Efficiencies of these systems are theoretically proven to be significantly higher (80 to 90%) as compared to a heat pump such as an ordinary refrigeration system.

A conditional expression that satisfies the relationship described above ((copper loss of the normal conducting motor 1001+operating power of the motor cooling equipment 1002)>operating power of the cooling circuit 5) will now be derived from considerations of thermodynamic theories.

A nitrogen liquefaction cycle is added in order to realize superconduction. In the nitrogen liquefaction cycle, a temperature of a temperature end is set to the temperature of liquefied natural gas (110 K) in order to secure refrigerating efficiency. In other words, the nitrogen liquefaction cycle is within the liquefied natural gas and loss or discharged heat from the nitrogen liquefaction cycle is to be temporarily imparted to the liquefied natural gas. Since the heat imparted to the liquefied natural gas becomes heat for gasifying the liquefied natural gas, an amount of BOG slightly increases when the nitrogen liquefaction cycle is added. Unless the decrease in the amount of energy due to the use of the superconducting motor 3 is greater than this loss, there is no advantage in using the superconducting motor 3.

An ideal efficiency (Carnot efficiency) of a reversible refrigeration cycle is represented by Expression (2) as a coefficient of performance (COP).

$$COP = \frac{Q}{W} = \frac{T_c}{T_h - T_c} \qquad (2)$$

$T_h$ denotes a temperature of a high heat source and $T_c$ denotes a temperature of a low heat source.

Therefore, work W necessary for generating refrigeration of a heat quantity (Q) is represented by Expression (3).

$$W = \frac{T_h - T_c}{T_c} Q \qquad (3)$$

However, since Expression (3) must be multiplied by an efficiency of a driving motor, Expression (4) is obtained.

$$\eta W = \frac{T_h - T_c}{T_c} Q \qquad (4)$$

Therefore, work W necessary for obtaining the heat quantity (Q) is represented by Expression (5).

$$W = \frac{T_h - T_c}{T_c} \frac{Q}{\eta} \qquad (5)$$

An efficiency of a non-superconducting motor is denoted by $\eta_n$. Work $W_n$ represented by Expression (6) must be input in order to generate LNG refrigeration of the heat quantity (Q).

$$W_n = \frac{T_h - T_c}{T_c} \frac{Q}{\eta_n} \qquad (6)$$

On the other hand, an efficiency of the superconducting motor 3 is denoted by $\eta_s$. Work $W_s$ represented by Expression (7) must be input in order to generate LNG refrigeration of the heat quantity (Q).

$$W_s = \frac{T_h - T_c}{T_c} \frac{Q}{\eta_s} \tag{7}$$

Therefore, Expression (8) represents energy that can be saved by using the superconducting motor 3.

$$W_n - W_s = \frac{T_h - T_c}{T_c} \frac{Q(\eta_s - \eta_n)}{\eta_n \eta_s} \tag{8}$$

Meanwhile, in order to drive the superconducting motor 3 in a state where the temperature of the superconducting motor 3 is set to 77 K to place the superconducting motor 3 in a superconducting state, a nitrogen-circulating independent cooling system is required. Although an improvement in motor efficiency may be achieved by making the motor superconductive, finite efficiency remains even in this case. In addition, since the independent cooling system is arranged in liquefied natural gas via an insulating layer, heat infiltration via a power shaft or a sealing mechanism occurs. Furthermore, compression heat generated at the second compression section 50 is cooled by liquefied natural gas (the liquefied natural gas corresponds to an aftercooler used in a compressor arranged under normal temperature). These losses are expressed as follows.

Motor loss at superconducting motor 3 . . . $Q_{N2\text{-}motor}$

Heat infiltration loss of housing of superconducting motor 3 . . . $Q_{N2\text{-}heat}$ (however, $Q_{N2\text{-}heat}$ becomes a cooling action with respect to liquefied natural gas)

Loss due to generation of compression heat by second compression section 50 . . . $Q_{N2\text{-}comp}$ When using the superconducting motor 3, a sum value of these losses ($Q_{N2\text{-}motor}+Q_{N2\text{-}heat}+Q_{N2\text{-}comp}$) represent a new heat load on liquefied natural gas.

Therefore, in order to conserve energy in the liquefaction system 1a shown in FIG. 1, a relationship represented by Expression (9) must be satisfied.

$$Q_{N2\text{-}motor} + Q_{N2\text{-}heat} + Q_{N2\text{-}comp} < \frac{T_h - T_c}{T_c} \frac{Q(\eta_s - \eta_n)}{\eta_n \eta_s} \tag{9}$$

For example, if $\eta_n$=0.9, $\eta_s$=0.95, $T_h$=300 K, and $T_c$=110 K, then a right side of Expression (9) is represented by Expression (10).

$$\frac{T_h - T_c}{T_c} \frac{Q(\eta_s - \eta_n)}{\eta_n \eta_s} = \frac{300 - 110}{110} \frac{Q(0.95 - 0.9)}{0.9 \cdot 0.95} = 0.10Q \tag{10}$$

Accordingly, ($Q_{N2\text{-}motor}+Q_{N2\text{-}heat}+Q_{N2\text{-}comp}$)<0.10Q. This indicates that an advantage of using the superconducting motor 3 is gained if total heat generation by the superconducting motor 3 is equal to or less than 10% of refrigeration output of liquefied natural gas.

Moreover, in reality, since various losses arise when forming a cooling cycle, it is also obvious from the law of energy conservation that the Carnot cycle assumed above is not satisfied. Accordingly, the right side of Expression (9) must be multiplied by various efficiencies.

Figure 7:
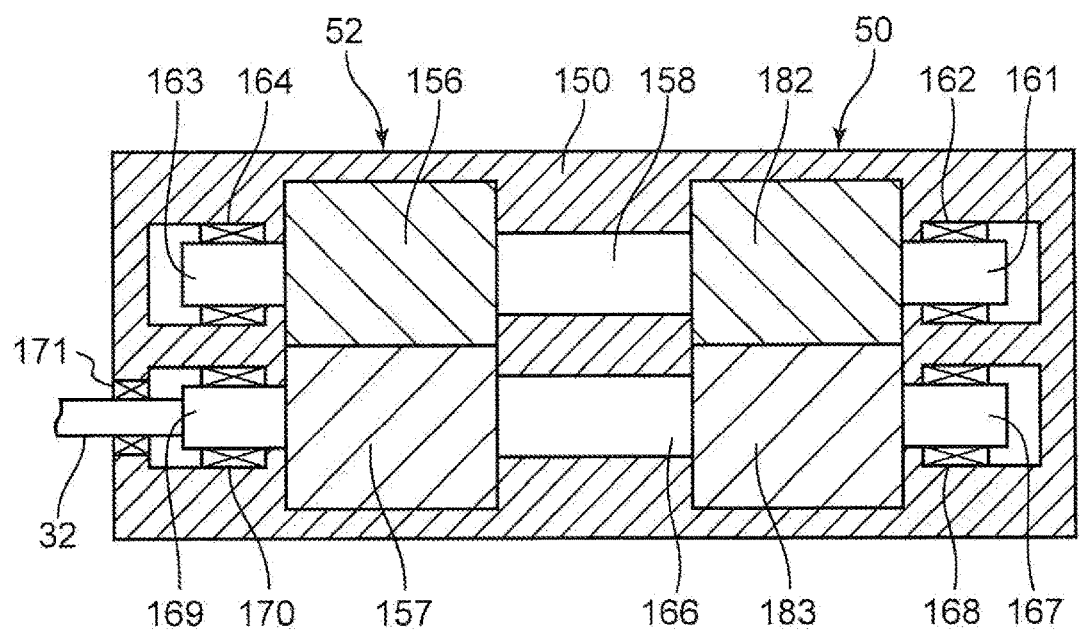
FIG. 7 is a transverse sectional view of a second compression section and a second expansion section shown in FIGS. 1 to 3.

[4] FIG. 7 is a transverse sectional view of the second compression section 50 and the second expansion section 52 shown in FIGS. 1 to 3. The second compression section 50 is a screw compressor that is a type of a displacement compressor and the second expansion section 52 is a screw expander that is a type of a displacement expander. The second compression section 50 includes a pair of female and male screw rotors 182 and 183 which mesh with each other and the second expansion section 52 includes a pair of female and male screw rotors 156 and 157 which mesh with each other.

The second compression section 50 and the second expansion section 52 are provided with a common integral casing 150. The screw rotors 182 and 183 of the second compression section 50 and the screw rotors 156 and 157 of the second expansion section 52 are respectively rotatably housed in the casing 150. Hereinafter, a female rotor 182 that is one screw rotor of the pair of screw rotors 182 and 183 of the second compression section 50 will be referred to as a compression female rotor 182, and a male rotor 183 that is the other screw rotor will be referred to as a compression male rotor 183. A female rotor 156 that is one screw rotor of the pair of screw rotors 156 and 157 of the second expansion section 52 will be referred to as an expansion female rotor 156, and a male rotor 157 that is the other screw rotor will be referred to as an expansion male rotor 157.

The compression female rotor 182 and the expansion female rotor 156 share a rotor shaft 158 located therebetween and the compression male rotor 183 and the expansion male rotor 157 share a rotor shaft 166 located therebetween. In other words, the compression female rotor 182 and the expansion female rotor 156 are coaxially arranged so as to be integrally rotatable around a same rotation shaft and are coupled to each other via the rotor shaft 158. In addition, the compression male rotor 183 and the expansion male rotor 157 are coaxially arranged so as to be integrally rotatable around a same rotation shaft and are coupled to each other via the rotor shaft 166. Due to this configuration, the second compression section 50 and the second expansion section 52 operate in cooperation instead of operating independently of each other.

A rotor shaft 161 is provided so as to extend toward an opposite side to the expansion female rotor 156 from the compression female rotor 182, and a rotor shaft 163 is provided so as to extend toward an opposite side to the compression female rotor 182 from the expansion female rotor 156. One rotor shaft 161 is rotatably supported by a corresponding bearing 162 provided inside the casing 150 and the other rotor shaft 163 is rotatably supported by a corresponding bearing 164 provided inside the casing 150.

A rotor shaft 167 is provided so as to extend toward an opposite side to the expansion male rotor 157 from the compression male rotor 183, and a rotor shaft 169 is provided so as to extend toward an opposite side to the compression male rotor 183 from the expansion male rotor 157. One rotor shaft 167 is rotatably supported by a corresponding bearing 168 provided inside the casing 150 and the other rotor shaft 169 is rotatably supported by a corresponding bearing 170 provided inside the casing 150. A rotating body constituted by the compression female rotor 182, the expansion female rotor 156, and the rotor shafts 158, 161, and 163 and a rotating body constituted by the compression male rotor 183, the expansion male rotor 157, and the rotor shafts 166, 167, and 169 are arranged so that the rotor shafts 158, 161, and 163 and the rotor shafts 166, 167, and 169 are parallel to each other.

The rotor shaft 169 is coupled to the other side 32 of the rotary shaft 30 of the superconducting motor 3. Accordingly, as the rotary shaft 30 rotates, the rotating body constituted by the expansion male rotor 157, the compression male rotor 183, and the rotor shafts 166, 167, and 169 rotates. The other side 32 of the rotary shaft 30 is rotatably supported by a corresponding bearing 171 provided inside the casing 150.

The expansion female rotor 156 and the expansion male rotor 157 respectively have teeth shapes that avoid coming into contact with each other when the rotors mesh with each other and rotate together. In other words, the expansion female rotor 156 and the expansion male rotor 157 respectively have teeth shapes that enable a minute gap to be maintained between teeth surfaces (outer surfaces) of the rotors 156 and 157 during rotation. Furthermore, favorably, the compression female rotor 182 and the compression male rotor 183 respectively have teeth shapes that avoid coming into contact with each other when the rotors mesh with each other and rotate together.

The casing 150 encloses the rotating body constituted by the compression female rotor 182, the expansion female rotor 156, and the rotor shafts 158, 161, and 163 and the rotating body constituted by the compression male rotor 183, the expansion male rotor 157, and the rotor shafts 166, 167, and 169. Since the casing 150 is arranged in the second space section 22 in the tank 2 in the case of FIGS. 1 and 3, a temperature of the casing 150 is maintained at more or less the same temperature as liquefied natural gas.

In a state where the superconducting motor 3 integrally rotates the expansion male rotor 157 and the compression male rotor 183 and integrally rotates the expansion female rotor 156 and the compression female rotor 182, the refrigerant discharged from the second heat exchange section 53 shown in FIGS. 1 to 3 is sucked into the second compression section 50 through a compressor intake port (not shown) formed on the casing 150. The refrigerant sucked into the second compression section 50 is introduced into a confining space formed between the compression female rotor 182 and the compression male rotor 183 and an inner surface of the casing 150, and is compressed as the confining space is reduced as the compression female rotor 182 and the compression male rotor 183 rotate in respectively opposite directions. In this case, the compression male rotor 183 rotates clockwise and the compression female rotor 182 rotates counterclockwise. The compressed refrigerant is discharged from a compressor discharge port (not shown) formed on the casing 150 and is supplied to an expander intake port (not shown) formed on the casing 150 through the first heat exchange section 51 shown in FIGS. 1 to 3.

The refrigerant sucked into the second expansion section 52 through the expander intake port is confined in a space formed between the expansion female rotor 156 and the expansion male rotor 157 and the inner surface of the casing 150. In addition, due to rotation of the expansion female rotor 156 and the expansion male rotor 157, the space between the expansion female rotor 156 and the expansion male rotor 157 and the inner surface of the casing 150 increases and the refrigerant confined in the space expands. The expanded refrigerant is discharged from an expander discharge port (not shown) formed on the casing 150 and is supplied to the superconducting motor 3.

Since the refrigerant confined in the space between the expansion female rotor 156 and the expansion male rotor 157 and the inner surface of the casing 150 is the refrigerant compressed by the second compression section 50, air pressure energy (pressure) of the refrigerant acts in a direction that causes the space between the expansion female rotor 156 and the expansion male rotor 157 and the inner surface of the casing 150 to increase. Therefore, a force that causes the expansion female rotor 156 and the expansion male rotor 157 to respectively rotate in opposite directions acts on the rotors 156 and 157 from the refrigerant. Since the force is transferred to the compression female rotor 182 coupled to the expansion female rotor 156 and to the compression male rotor 183 coupled to the expansion male rotor 157, the force contributes as power for rotating the compression female rotor 182 and the compression male rotor 183. In this manner, the air pressure energy generated by compression of the refrigerant by the second compression section 50 is regenerated and power consumption of the superconducting motor 3 is significantly reduced. For example, power consumption is reduced to or below 50% of power consumption when the superconducting motor 3 rotates the compression female rotor 182 and the compression male rotor 183 in a case where such energy regeneration is not performed.

While the regeneration described above is realized by having the second compression section 50 and the second expansion section 52 share the rotor shafts 158 and 166, the regeneration can also be realized by coupling the rotor shaft of the second compression section 50 and the rotor shaft of the second expansion section 52 with a gear.

[5] A gas-liquid two-phase cooler is used as the cooling circuit 5 shown in FIGS. 1 to 3. Specifically, sealing pressure of the refrigerant, structures of the second compression section 50 and the second expansion section 52, and numbers of rotations of the rotors (the expansion female rotor 156, the expansion male rotor 157, the compression female rotor 182, and the compression male rotor 183 shown in FIG. 7) are designed so that the refrigerant (liquid nitrogen) after cooling the superconducting magnet of the superconducting motor 3 is changed to a gas (gas phase) at the second heat exchange section 53, compressed by the second compression section 50, cooled by the first heat exchange section 51, and expanded by the second expansion section 52 to become a liquid (liquid phase).

Since significant input and output of latent heat occur during a phase change between a gas phase and a liquid phase, cooling capability can be increased.

With a gas-liquid two-phase cooler, since a liquid phase portion of the refrigerant functions as a sealing liquid between the casing 150 and tips of teeth of the rotors and the twin rotors shown in FIG. 7, compression performance of the second compression section 50 and expansion performance of the second expansion section 52 can be improved. A detailed description will be given below.

In an ordinary compressor that is operated under room temperature, by providing a certain gap in a sliding section between a movable section and a fixed cylinder and filling the gap with a low-viscosity oil, sealing characteristics may be secured. Generally, there is no oil substance that is usable in a compressor to be used in a low temperature (for example, 110 K) environment. In consideration thereof, if base pressure (1 atmospheric pressure or higher) of the refrigerant (liquid nitrogen) is to be selected so that a gas-liquid two-phase exists in a temperature range between 110 K and a critical temperature of an oxide-based superconductor (a temperature equal to or below 77 K that is the boiling point of nitrogen), a state is created where liquid phase nitrogen is mixed in the refrigerant in the second compression section 50 and the second expansion section 52. Since viscosity of liquid phase nitrogen is approximately ¹/₁₀ of viscosity of room-temperature oil, liquid phase nitrogen functions as an ideal lubricating liquid and sealing liquid.

[6] The second compression section 50 and the second expansion section 52 shown in FIG. 7 are an oil-free twin-screw compressor and an oil-free twin-screw expander which use the liquid phase refrigerant as a liquid seal. Accordingly, since frictional resistance of the second compression section 50 and the second expansion section 52 can be minimized, power necessary for actuating the superconducting motor 3 can be conserved. With the screw system shown in FIG. 7, if materials of the casing 150 and the rotors (the expansion female rotor 156, the expansion male rotor 157, the compression female rotor 182, and the compression male rotor 183) are to be appropriately selected from the perspective of coefficients of thermal expansion, compression operations and expansion operations can be performed in a friction-less and continuous manner even in a low-temperature (for example, 113 K) atmosphere.

[7] In the twin-screw second compression section 50 and the twin-screw second expansion section 52 shown in FIG. 7, a coefficient of thermal expansion of the material of the casing 150 is set larger than a coefficient of thermal expansion of the material of the rotors (the expansion female rotor 156, the expansion male rotor 157, the compression female rotor 182, and the compression male rotor 183), and the casing 150 and the rotors are contracted so that an appropriate gap is formed between the casing 150 and tips of teeth of the rotors at a temperature of operating the cooling circuit 5.

When designing and assembling a screw compressor and a screw expander to be operated in a low-temperature (for example, 110 K to 70 K) environment, the low temperature must be taken into consideration with respect to clearances (gaps) between the casing 150 and the rotors and between the rotors. The coefficient of thermal expansion of the material of the casing 150 is set larger than the coefficient of thermal expansion of the material of the rotors. The screw compressor and the screw expander are assembled by increasing the gaps under normal temperature. When the screw compressor and the screw expander are used (in other words, when the screw compressor and the screw expander are placed in a low-temperature environment), since the casing 150 contracts more than the rotors, the gap decreases and assumes an appropriate size.

[8] Silicon nitride ceramic bearings are used as the bearings used in the superconducting motor 3 shown in FIG. 4 and the bearings used in the second compression section 50 and the second expansion section 52 shown in FIG. 7 (the bearings 162, 164, 168, 170, and 171).

Since a considerable eccentric load acts on the bearings of the screw compressor and the screw expander, bearings to which seizure preventive measures have been applied using lubricating oil must be used. However, there is no lubricating oil that can be used at low temperatures (equal to or lower than 110 K). Silicon nitride ceramic bearings used in pumps that supply liquid oxygen demonstrate superior resistance in cryogenic (−196° C.) environments. Ceramics characteristically hardly require lubrication.

[9] The seal member 23 shown in FIGS. 1 to 3 is a rotation transmission mechanism having a function of a bearing that rotatably supports the rotary shaft 30, a function of providing insulation between an installation space of the superconducting motor 3 and the outside, and a function of cutting off transfer of air between the installation space of the superconducting motor 3 and the outside.

The rotary shaft 30 of the superconducting motor 3 extends from the installation space of the superconducting motor 3 to the outside. A temperature of the superconducting motor 3 is a temperature of liquid nitrogen and a temperature of the outside is normal temperature. Since the seal member 23 is the rotation transmission mechanism described above, a highly-efficient liquefaction system and a highly-efficient power generation system are realized.

[10] The rotation transmission mechanism described above is a contactless rotation transmission mechanism (for example, a magnetic coupling mechanism) and the superconducting motor 3 is housed inside an airtight container.

Cooling is required to obtain a superconductive state. Cooling systems include a refrigerant-less system in which cold heat of the cooling circuit 5 is transferred to the superconducting motor 3 via a metal with superior thermal conductivity and a refrigerant system in which the superconducting motor 3 is immersed in a refrigerant liquid. When transferring power to outside equipment from the superconducting motor 3 by mechanical contact, a high-vacuum state must be maintained in the refrigerant-less system while measures for preventing leakage of the refrigerant must be taken in the refrigerant system. Accordingly, vacuum sealing and refrigerant sealing must be implemented with respect to the rotary shaft 30 of the superconducting motor 3. Implementing these measures requires considerable skill.

In consideration thereof, adopting a contactless rotation transmission mechanism enables power of the superconducting motor 3 to be transferred to the outside in a state where the superconducting motor 3 is installed inside an airtight container. This eliminates the need for the seal member 23. In addition, when replacing a module constituted by the superconducting motor 3, the second compression section 50, and the second expansion section 52 in response to the occurrence of a failure or the like of the superconducting motor 3, the module can be readily replaced.

[11] The superconducting motor 3 is an induction motor provided with a rotor on which a squirrel cage coil (a squirrel cage electrode) constituted by a superconducting material is arranged.

In an axial gap motor disclosed in Japanese Unexamined Patent Publication No. 2014-54092, a disk-shape permanent magnet is arranged on a rotor of the motor. When a superconducting coil is used in an axial gap motor, a squirrel cage coil is arranged in place of the disk-shape permanent magnet. For the squirrel cage coil, a configuration similar to that of the squirrel cage coil disclosed in Japanese Unexamined Patent Publication No. 2014-54092 can be adopted.

When the superconducting motor 3 has a structure where a rotor on which a stator and a squirrel cage coil are arranged is immersed in liquid nitrogen that is a refrigerant, since viscosity of liquid nitrogen is low, viscous resistance of liquid nitrogen with respect to the rotor is small. Therefore, since machine loss due to the rotation of the rotor is small, the superconducting motor 3 having the structure described above can be realized.

Summary of the Embodiments

A liquefaction system according to a first aspect includes: a storage section which stores a substance, whose boiling point is equal to or lower than room temperature, in a liquid state; a superconducting motor which includes a superconducting magnet constituted by a prescribed superconducting material; a liquefier which includes a first compression section that is driven by the superconducting motor and that compresses the substance in a gaseous states and a first expansion section that changes the substance from a gaseous state to a liquid state by expanding the substance compressed by the first compression section, and which generates the substance in a liquid state to be stored in the storage section; and a cooling circuit which includes a second compression section that is driven by the superconducting motor when the first compression section is being driven by the superconducting motor and that compresses a refrigerant, a first heat exchange section that cools the refrigerant by causing a heat exchange between the substance stored in the storage section and the refrigerant compressed by the second compression section, a second expansion section that brings the refrigerant down to or below a critical temperature of the superconducting material by expanding the refrigerant cooled by the first heat exchange section, and a second heat exchange section that imparts cold heat of the refrigerant to the substance by causing a heat exchange between the substance stored in the storage section and the refrigerant after cooling the superconducting magnet, and which supplies the refrigerant brought down to or below the critical temperature by the second expansion section to the superconducting motor and cools the superconducting magnet down to or below the critical temperature.

In the liquefaction system according to the first aspect, since the refrigerant is cooled as the first heat exchange section causes a heat exchange to be performed between the compressed refrigerant and the substance in the storage section, heat is imparted from the refrigerant to the substance in the storage section. Meanwhile, the second heat exchange section imparts cold heat of the refrigerant to the substance in the storage section by causing a heat exchange between the refrigerant after cooling the superconducting magnet and the substance in the storage section. Accordingly, due to the heat exchange by the first heat exchange section, a temperature of the substance in the storage section can be prevented from rising.

In addition, in the liquefaction system according to the first aspect, the second compression section is driven using only a part of the power of the superconducting motor which drives the first compression section of the liquefier.

As described above, with the liquefaction system according to the first aspect, since a motor for driving the second compression section of the cooling circuit is not separately provided, energy for bringing a refrigerant, which cools the superconducting magnet of the superconducting motor down to or below a critical temperature, down to or below the critical temperature can be reduced.

In the configuration described above, the storage section includes: a first space section in which the substance is stored and in which the first heat exchange section and the second heat exchange section are arranged; and a second space section in which the superconducting motor, the second compression section, and the second expansion section are arranged and which is isolated from the first space section.

Since the first space section and the second space section are inside the storage section, heat infiltrating into the second space section from the outside can be reduced using the substance in the first space section. Therefore, according to this configuration, since an amount of heat infiltration into the second space section which houses the superconducting motor and the second compression section and the second expansion section of the cooling circuit can be reduced, energy for bringing the refrigerant down to or below the critical temperature can be reduced.

In the configuration described above, a heat-insulating airtight container which is mounted to the storage section on the outside of the storage section and which houses the superconducting motor, the second compression section, and the second expansion section is further provided, wherein the first heat exchange section and the second heat exchange section are arranged in the storage section.

By housing the superconducting motor and the second compression section and the second expansion section of the cooling circuit inside the heat-insulating airtight container, a temperature inside the container can be set to more or less the same temperature as that of the substance in the storage section.

Efficiency of cooling the refrigerant declines as a distance between the first heat exchange section and the second compression section and a distance between the first heat exchange section and the second expansion section increase. According to this configuration, since the heat-insulating airtight container is mounted to the storage section on the outside of the storage section, the distance between the first heat exchange section and the second compression section and the distance between the first heat exchange section and the second expansion section can be reduced.

As described above, according to this configuration, energy for bringing the refrigerant down to or below the critical temperature can be reduced.

In the configuration described above, the second compression section is a screw compressor including a compression female rotor which is a screw rotor and a compression male rotor which is a screw rotor meshing with the compression female rotor, the second expansion section is a screw expander including an expansion female rotor which is a screw rotor and an expansion male rotor which is a screw rotor meshing with the expansion female rotor, the compression female rotor and the expansion female rotor are coupled to each other so as to be integrally rotatable around a same shaft, the compression male rotor and the expansion male rotor are coupled to each other so as to be integrally rotatable around a same shaft, and the superconducting motor rotates at least one of a rotating body which includes the expansion female rotor and the compression female rotor coupled thereto and another rotating body which includes the expansion male rotor and the compression male rotor coupled thereto.

According to this configuration, when the refrigerant compressed by the second compression section is adiabatically expanded by the second expansion section after being subjected to a heat exchange by the first heat exchange section, air pressure energy (pressure) of the compressed refrigerant acts so as to rotate the expansion female rotor and the expansion male rotor. With this liquefaction system, since the expansion female rotor and the compression female rotor are coupled to each other so as to be integrally rotatable and the expansion male rotor and the compression male rotor are coupled to each other so as to be integrally rotatable, a rotational force of the expansion female rotor that is attributable to air pressure energy is transferred to the compression female rotor and a rotational force of the expansion male rotor that is attributable to air pressure energy is transferred to the compression male rotor. As a result, power consumed by the superconducting motor in order to rotate the respective rotors can be significantly reduced.

A power generation system according to a second aspect includes: a storage section which stores a substance, whose boiling point is equal to or lower than room temperature, in a liquid state; a turbine which rotates using energy created by burning the substance supplied from the storage section; a superconducting generator which includes a rotary shaft and a superconducting magnet constituted by a prescribed superconducting material and which generates power as the rotary shaft is rotated by a rotation of the turbine; and a cooling circuit which includes a compression section that is driven by a rotation of the rotary shaft and that compresses a refrigerant, a first heat exchange section that cools the refrigerant by causing a heat exchange between the substance stored in the storage section and the refrigerant compressed by the compression section, an expansion section that brings the refrigerant down to or below a critical temperature of the superconducting material by expanding the refrigerant cooled by the first heat exchange section, and a second heat exchange section that imparts cold heat of the refrigerant to the substance by causing a heat exchange between the substance stored in the storage section and the refrigerant after cooling the superconducting magnet, and which supplies the refrigerant brought down to or below the critical temperature by the expansion section to the superconducting generator and cools the superconducting magnet down to or below the critical temperature.

In the power generation system according to the second aspect, since the refrigerant is cooled as the first heat exchange section causes a heat exchange to be performed between the compressed refrigerant and the substance in the storage section, heat is imparted from the refrigerant to the substance in the storage section. Meanwhile, the second heat exchange section imparts cold heat of the refrigerant to the substance in the storage section by causing a heat exchange between the refrigerant after cooling the superconducting magnet and the substance in the storage section. Accordingly, due to the heat exchange by the first heat exchange section, a temperature of the substance in the storage section can be prevented from rising.

In addition, in the power generation system according to the second aspect, when power is being generated by rotating the rotary shaft of the superconducting generator using a rotation of the turbine, the compression section is driven only using the rotation of the rotary shaft.

As described above, with the power generation system according to the second aspect, since a motor for driving the compression section of the cooling circuit is not separately provided, energy for bringing a refrigerant, which cools the superconducting magnet of the superconducting generator down to or below a critical temperature, down to or below the critical temperature can be reduced.

In the configuration described above, the storage section includes: a first space section in which the substance is stored and in which the first heat exchange section and the second heat exchange section are arranged; and a second space section in which the superconducting generator, the compression section, and the expansion section are arranged and which is isolated from the first space section.

Since the first space section and the second space section are inside the storage section, heat infiltrating into the second space section from the outside can be reduced using the substance in the first space section. Therefore, according to this configuration, since an amount of heat infiltration into the second space section which houses the superconducting generator and the compression section and the expansion section of the cooling circuit can be reduced, energy for bringing the refrigerant down to or below the critical temperature can be reduced.

In the configuration described above, a heat-insulating airtight container which is mounted to the storage section on the outside of the storage section and which houses the superconducting generator, the compression section, and the expansion section is further provided, wherein the first heat exchange section and the second heat exchange section are arranged in the storage section.

By housing the superconducting generator and the compression section and the expansion section of the cooling circuit inside the heat-insulating airtight container, a temperature inside the container can be set to more or less the same temperature as that of the substance in the storage section.

Efficiency of cooling the refrigerant declines as a distance between the first heat exchange section and the compression section and a distance between the second heat exchange section and the expansion section increase. According to this configuration, since the heat-insulating airtight container is mounted to the storage section on the outside of the storage section, the distance between the first heat exchange section and the compression section and the distance between the second heat exchange section and the expansion section can be reduced.

As described above, according to this configuration, energy for bringing the refrigerant down to or below the critical temperature can be reduced.

In the configuration described above, the compression section is a screw compressor including a compression female rotor which is a screw rotor and a compression male rotor which is a screw rotor meshing with the compression female rotor, the expansion section is a screw expander including an expansion female rotor which is a screw rotor and an expansion male rotor which is a screw rotor meshing with the expansion female rotor, the compression female rotor and the expansion female rotor are coupled to each other so as to be integrally rotatable around a same shaft, the compression male rotor and the expansion male rotor are coupled to each other so as to be integrally rotatable around a same shaft, and at least one of a rotating body which includes the expansion female rotor and the compression female rotor coupled thereto and another rotating body which includes the expansion male rotor and the compression male rotor coupled thereto rotates as the rotary shaft rotates due to a rotation of the turbine.

According to this configuration, when the refrigerant compressed by the compression section is adiabatically expanded by the expansion section after being subjected to a heat exchange by the first heat exchange section, air pressure energy (pressure) of the compressed refrigerant acts so as to rotate the expansion female rotor and the expansion male rotor. With this power generation system, since the expansion female rotor and the compression female rotor are coupled to each other so as to be integrally rotatable and the expansion male rotor and the compression male rotor are coupled to each other so as to be integrally rotatable, a rotational force of the expansion female rotor that is attributable to air pressure energy is transferred to the compression female rotor and a rotational force of the expansion male rotor that is attributable to air pressure energy is transferred to the compression male rotor. As a result, power consumed by the superconducting generator in order to rotate the respective rotors can be significantly reduced.

The present application claims priority on the basis of Japanese Patent Application No. 2015-46253 filed on Mar. 9, 2015, the entire contents of which are incorporated herein by reference.

Although the present invention has been described above in an appropriate and sufficient manner in the form of embodiments with reference to the drawings, those skilled in the art will understand that various modifications and/or improvements may be readily made to the embodiments described above. Therefore, it is to be understood that all modifications and/or improvements implemented by those skilled in the art shall fall within the scope of the claims presented below unless such modifications and/or improvements depart from the scope of the claims.

The invention claimed is:

1. A liquefaction system comprising:
a storage tank which stores a substance, whose boiling point is equal to or lower than room temperature, in a liquid state;
a superconducting motor which includes a superconducting magnet constituted by a superconducting material;
a liquefier which includes a first compressor that is driven by the superconducting motor and that compresses the substance in a gaseous states and a first expansion section that changes the substance from a gaseous state to a liquid state by expanding the substance compressed by the first compressor, and which generates the substance in a liquid state to be stored in the storage tank; and
a cooling circuit which includes a second compressor that is driven by the superconducting motor when the first compressor is being driven by the superconducting motor and that compresses a refrigerant, a first heat exchanger that cools the refrigerant by causing a heat exchange between the substance stored in the storage tank and the refrigerant compressed by the second compressor, a second expansion section that brings the refrigerant down to or below a critical temperature of the superconducting material by expanding the refrigerant cooled by the first heat exchanger, and a second heat exchanger that imparts cooling of the refrigerant to the substance by causing a heat exchange between the substance stored in the storage tank and the refrigerant after cooling the superconducting magnet, and which supplies the refrigerant brought down to or below the critical temperature by the second expansion section to the superconducting motor and cools the superconducting magnet down to or below the critical temperature, wherein,
the first expansion section is a first expander or a first expansion valve,
the second expansion section is a second expander or a second expansion valve.

2. The liquefaction system according to claim 1, wherein the storage tank includes:
a first space of the tank in which the substance is stored and in which the first heat exchanger and the second heat exchanger are arranged; and
a second space of the tank in which the superconducting motor, the second compressor, and the second expansion section are arranged, the first space of the tank and the second space of the tank being fluidly sealed and airtight from each other.

3. The liquefaction system according to claim 1, further comprising
a heat-insulating airtight container which is mounted to the storage tank on the outside of the storage tank and which houses the superconducting motor, the second compressor, and the second expansion section, wherein the first heat exchanger and the second heat exchanger are arranged in the storage tank.

4. The liquefaction system according to claim 1, wherein
the second compressor is a screw compressor including a compression female rotor which is a screw rotor and a compression male rotor which is a screw rotor meshing with the compression female rotor,
the second expansion section is a screw expander including an expansion female rotor which is a screw rotor and an expansion male rotor which is a screw rotor meshing with the expansion female rotor,
the compression female rotor and the expansion female rotor are coupled to each other so as to be integrally rotatable around a same shaft,
the compression male rotor and the expansion male rotor are coupled to each other so as to be integrally rotatable around a same shaft, and
the superconducting motor rotates at least one of a rotating body which includes the expansion female rotor and the compression female rotor coupled to the expansion female rotor and another rotating body which includes the expansion male rotor and the compression male rotor coupled to the expansion male rotor.

5. The liquefaction system according to claim 2, wherein
the second compressor is a screw compressor including a compression female rotor which is a screw rotor and a compression male rotor which is a screw rotor meshing with the compression female rotor,
the second expansion section is a screw expander including an expansion female rotor which is a screw rotor and an expansion male rotor which is a screw rotor meshing with the expansion female rotor,
the compression female rotor and the expansion female rotor are coupled to each other so as to be integrally rotatable around a same shaft,
the compression male rotor and the expansion male rotor are coupled to each other so as to be integrally rotatable around a same shaft, and
the superconducting motor rotates at least one of a rotating body which includes the expansion female rotor and the compression female rotor coupled to the expansion female rotor and another rotating body which includes the expansion male rotor and the compression male rotor coupled to the expansion male rotor.

6. The liquefaction system according to claim 3, wherein
the second compressor is a screw compressor including a compression female rotor which is a screw rotor and a compression male rotor which is a screw rotor meshing with the compression female rotor,
the second expansion section is a screw expander including an expansion female rotor which is a screw rotor and an expansion male rotor which is a screw rotor meshing with the expansion female rotor,
the compression female rotor and the expansion female rotor are coupled to each other so as to be integrally rotatable around a same shaft,
the compression male rotor and the expansion male rotor are coupled to each other so as to be integrally rotatable around a same shaft, and
the superconducting motor rotates at least one of a rotating body which includes the expansion female rotor and the compression female rotor coupled to the expansion female rotor and another rotating body which includes the expansion male rotor and the compression male rotor coupled to the expansion male rotor.

* * * * *